US009641467B2

(12) United States Patent
    Kuo

(10) Patent No.: US 9,641,467 B2
(45) Date of Patent: May 2, 2017

(54) INTELLIGENT NOTIFICATION FILTERING METHOD AND HANDHELD COMMUNICATION DEVICE

(71) Applicant: HTC Corporation, Taoyuan, Taoyuan County (TW)

(72) Inventor: Wei-Chih Kuo, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 294 days.

(21) Appl. No.: 14/556,270

(22) Filed: Dec. 1, 2014

(65) Prior Publication Data
    US 2016/0154574 A1    Jun. 2, 2016

(51) Int. Cl.
    *H04L 12/58*    (2006.01)
    *H04N 21/00*    (2011.01)
    *H04M 1/725*    (2006.01)

(52) U.S. Cl.
    CPC ............... *H04L 51/00* (2013.01); *H04L 12/58* (2013.01); *H04L 51/14* (2013.01); *H04L 51/26* (2013.01);
    (Continued)

(58) Field of Classification Search
    CPC ...... H04N 21/00; H04M 11/00; H04M 1/575; H04M 1/72547; H04M 1/7253;
    (Continued)

(56) References Cited

U.S. PATENT DOCUMENTS 7,469,280 B2 * 12/2008 Simpson .............. G06Q 10/107
                                                         379/100.08
7,761,429 B2 *  7/2010 Polimeni ................ H04L 51/22
                                                         707/668
(Continued)

FOREIGN PATENT DOCUMENTS

TW        200925980 A     6/2009
TW        201038022 A1   10/2010
TW        201324331 A1    6/2013

OTHER PUBLICATIONS

Office Action issued in corresponding Taiwan application on Dec. 10, 2015.

*Primary Examiner* — Ali Neyzari
(74) *Attorney, Agent, or Firm* — McClure, Qualey & Rodack, LLP

(57) ABSTRACT

An intelligent notification filtering method is disclosed. The intelligent notification filtering method is suitable for a handheld communication device performing a wireless projection. The intelligent notification filtering method includes following steps: establishing a high-priority list automatically; in response to the handheld communication device receiving an incoming notification event, determining whether the incoming notification event is listed in the high-priority list or not; interrupting the wireless projection on the handheld communication device and displaying contents of the incoming notification event, if the incoming notification event is listed in the high-priority list; and, keeping on performing the wireless projection by the handheld communication device and setting the incoming notification event pending, if the incoming notification event is not listed in the high-priority list. In addition, a handheld communication device is also disclosed herein.

10 Claims, 4 Drawing Sheets

(52) U.S. Cl.
CPC .......... *H04M 1/7253* (2013.01); *H04N 21/00* (2013.01); *H04M 1/72597* (2013.01)

(58) Field of Classification Search
CPC ............ H04M 1/72597; G06F 3/04847; G06F 3/04842; G06F 17/30867; A61B 5/746; H04W 4/14; G06Q 10/107; H04L 12/5855; H04L 51/14; H04L 51/26; H04L 12/58
USPC ......... 340/7.59; 715/772; 709/207; 455/466, 455/404
See application file for complete search history.

(56) References Cited

U.S. PATENT DOCUMENTS

| | | | |
|---|---|---|---|
| 8,229,413 B2* | 7/2012 | Brown | H04L 51/12 |
| | | | 379/142.01 |
| 8,315,607 B2* | 11/2012 | Chen | G06Q 10/107 |
| | | | 455/412.1 |
| 8,948,818 B2 | 2/2015 | Wang | |
| 9,313,629 B2* | 4/2016 | Chen | G06Q 10/107 |
| 2013/0024853 A1 | 1/2013 | You | |
| 2013/0141331 A1 | 6/2013 | Shiu et al. | |
| 2013/0150099 A1 | 6/2013 | Chen et al. | |

* cited by examiner

INTELLIGENT NOTIFICATION FILTERING METHOD AND HANDHELD COMMUNICATION DEVICE

BACKGROUND

Field of Invention

The present application relates to a communication device and a controlling method thereof. More particularly, the present application relates to an intelligent notification filtering method on a handheld communication device.

Description of Related Art

Lifestyle in the modern society is usually busy and tense. Therefore, people are searching for efficient and convenient products to deal to fulfill all kinds of demanding. For example, mobile phone, tablet or personal digital assistants and other handheld devices are required to be powerful, user-friendly and portable. In addition, most users require their handheld communication devices (e.g., smart phones) to be capable of lively updating all kinds of important information.

Recently, the smart phones are equipped with the function of notifying live messages. Through push-broadcasting transmissions or regularly updates, the smart phones may display live notifications (e.g., in-call notifications, text messages, system updates, email notifications, calendar notifications, mobile advertisements, game messages, application program notifications, etc), such that the user can acknowledge aforesaid live information. Users usually install various kinds of application programs, which may correspondingly generate different notification messages with different important levels.

Due to functions of the smart phones are diversified and specialized, users may utilized their phones in some important business situation, such as utilizing their smart phones to project screens in some interviewing, telephone conferences, product briefings or some meeting with important personals. When the smart phones are utilized to project in important occasions, it will be annoying when interfaces of the phones are repeatedly occupied by some notification messages or when projecting screens are occasionally interrupted by the notification messages.

If the phones can intelligently detect the functions, which are currently launched by their users, and accordingly update notifications with high importance, it will bring better experience to the users by avoiding unnecessary interruption caused by the notifications with low importance.

SUMMARY

This disclosure provides an intelligent notification filtering method and a handheld communication device, which are capable of establishing a high-priority list automatically, filtering an incoming notification event according to the high-priority list, and selectively interrupting a wireless projection or setting the incoming notification event pending.

An aspect of the present disclosure is to provide an intelligent notification filtering method, which is suitable for a handheld communication device performing a wireless projection. The intelligent notification filtering method includes steps of: establishing a high-priority list automatically; in response to the handheld communication device receiving an incoming notification event, determining whether the incoming notification event is listed in the high-priority list or not; interrupting the wireless projection on the handheld communication device and displaying contents of the incoming notification event, if the incoming notification event is listed in the high-priority list; and, keeping on performing the wireless projection by the handheld communication device and setting the incoming notification event pending, if the incoming notification event is not listed in the high-priority list.

According to an embodiment of the disclosure, before the high-priority list is automatically established, the intelligent notification filtering method further includes a step of collecting critical information of the handheld communication device by a background process. The critical information is utilized to establishing the high-priority list automatically.

According to an embodiment of the disclosure, the critical information includes at least one selected from a contact list of the handheld communication device, a group classification of the contact list, a plurality of notification event types and an image content of the wireless projection.

According to an embodiment of the disclosure, the notification event types includes at least one selected from a in-call notification, an instant message notification, an emergency message notification, an email notification, a system update notification, an application program notification, a calendar notification, a power alert notification and an alarm clock notification.

According to an embodiment of the disclosure, in step of establishing the high-priority list automatically, the intelligent notification filtering method further includes a step of dynamically adjusting the high-priority list according to a system clock.

An aspect of the present disclosure is to provide a handheld communication device, which includes a wireless projection module and a processing module. The wireless projection module is configured to wirelessly transmit an image content to an external displayer for projecting the image content onto the external displayer. The processing module includes a notification receiving unit and a notification filtering unit. The notification receiving unit is configured to receive an incoming notification event. The notification filtering unit is configured to establish a high-priority list automatically. In response to the handheld communication device receives an incoming notification event, the notification filtering unit determines whether the incoming notification event is listed in the high-priority list or not. If the incoming notification event is listed in the high-priority list, the wireless projection module interrupts the wireless projection on the handheld communication device and displays contents of the incoming notification event. If the incoming notification event is not listed in the high-priority list, the wireless projection module keeps on performing the wireless projection and sets the incoming notification event pending.

According to an embodiment of the disclosure, the notification filtering unit collects critical information by a background process and automatically establishes the high-priority list according to the critical information.

According to an embodiment of the disclosure, the critical information includes at least one selected from a contact list of the handheld communication device, a group classification of the contact list, a plurality of notification event types and an image content of the wireless projection.

According to an embodiment of the disclosure, the notification event types comprises at least one selected from a in-call notification, an instant message notification, an emergency message notification, an email notification, a system update notification, an application program notification, a calendar notification, a power alert notification and an alarm clock notification.

According to an embodiment of the disclosure, wherein the notification filtering unit further adjusts the high-priority list dynamically according to a system clock.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
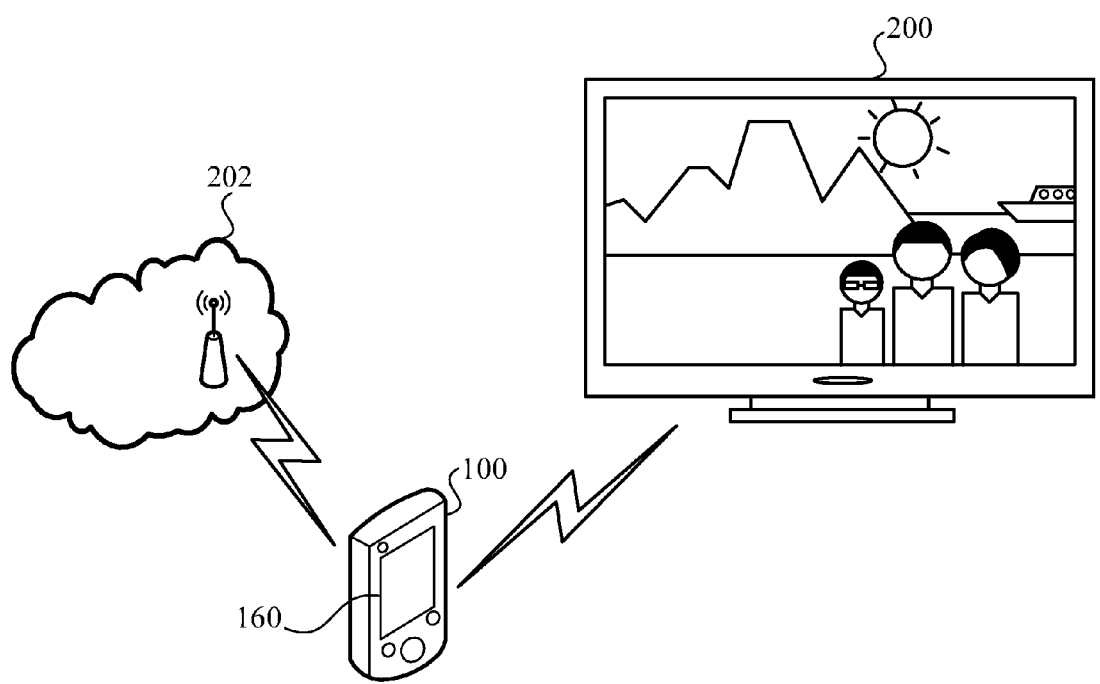
FIG. 1 is a schematic diagram illustrating a system which includes a handheld communication device and an external displayer according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Recently, a cutting-edge handheld communication device is capable of performing a wireless projection function, which is utilized to transmit image contents generated by the handheld communication device to an external displayer wirelessly, so as to project the image contents onto the external displayer with a lager size. This function is useful in business briefings, meetings or similar situations. When the users perform the wireless projection through their handheld communication devices, they do not want to be interrupted frequently by notification messages, and they also do not want their messages including some personal privacy information to be projected on the external displayer.

Figure 2:
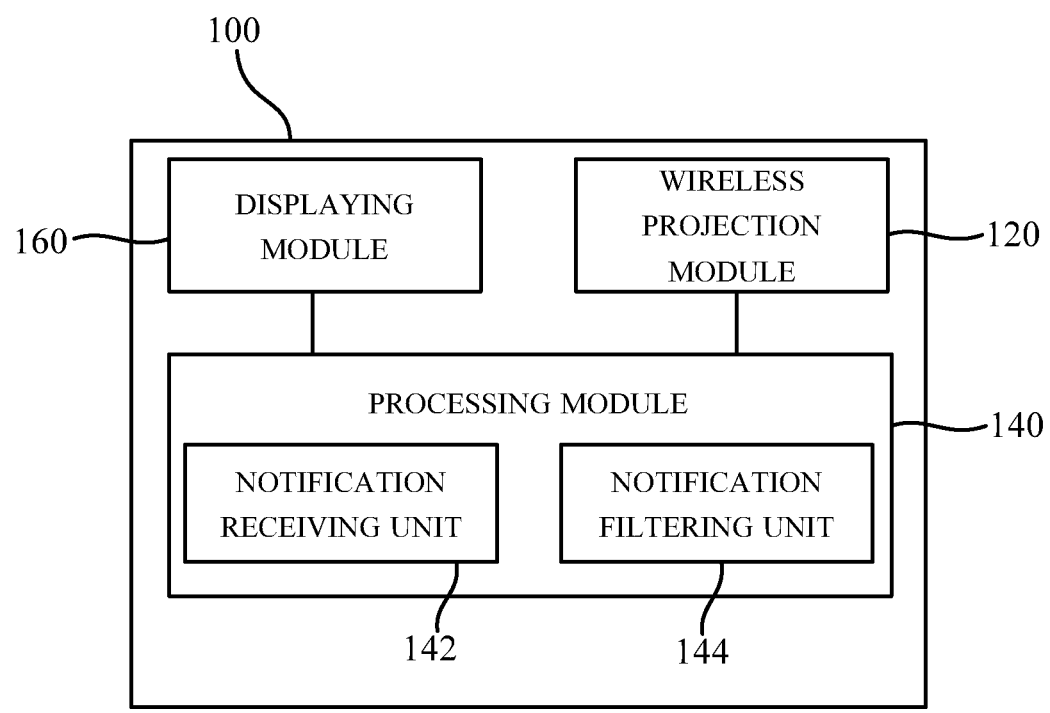
FIG. 2 is a functional block diagram illustrating the handheld communication device as the embodiment shown in FIG. 1.

Reference is made to FIG. 1 and FIG. 2. FIG. 1 is a schematic diagram illustrating a system which includes a handheld communication device 100 and an external displayer 200 according to an embodiment of the disclosure. FIG. 2 is a functional block diagram illustrating the handheld communication device 100 as the embodiment shown in FIG. 1.

As shown in FIG. 2, the handheld communication device 100 includes a wireless projection module 120, a processing module 140 and a displaying module 160. The wireless projection module 120 is utilized to transmit image contents generated by the handheld communication device 100 to the external displayer 200 wirelessly. For example, aforesaid image contents can be a mirrored screen duplicated from an screen currently displayed on the displaying module 160, or aforesaid image contents is an outputted screen generated by a graphic circuit (not shown in figures) of the handheld communication device 100 besides the screen currently displayed on the displaying module 160. Therefore, the image contents can be projected to the external displayer (e.g., a television, a projector or other digital displayers) with the larger size.

The processing module 140 includes a notification receiving unit 142 and a notification filtering unit 144. The notification receiving unit 142 is configured to receive an incoming notification event. In general, the handheld communication device 100 is communicatively connected to a mobile communication network 202. The notification receiving unit 142 is able to receive incoming notification events (e.g., an in-call notification, an text message notification, an instant message notification, an emergency message notification, an email notification, a system update notification, a notification from an network server terminal of an application program, etc) from an external source (e.g., from the mobile communication network 202). In addition, the notification receiving unit 142 is also able to receive incoming notification events (e.g., a calendar notification, an alarm clock notification, a notification from a user terminal of an application program, a system update notification and a power alert notification) generated by an internal source in the handheld communication device 100.

When the handheld communication device 100 is performing the wireless projection by wireless projection module 120, if the notification receiving unit 142 receives an incoming notification event, the notification filtering unit is configured to estimate this incoming notification event and perform a proper filtering operation on the incoming notification event. In the embodiment, the notification filtering unit adopts an intelligent notification filtering method, and details of the method are disclosed as follows.

The notification filtering unit 144 automatically establishes a high-priority list. If the incoming notification event is listed in the high-priority list, the wireless projection of the wireless projection module 120 will be interrupted and contents of the incoming notification event are displayed.

Figure 3:
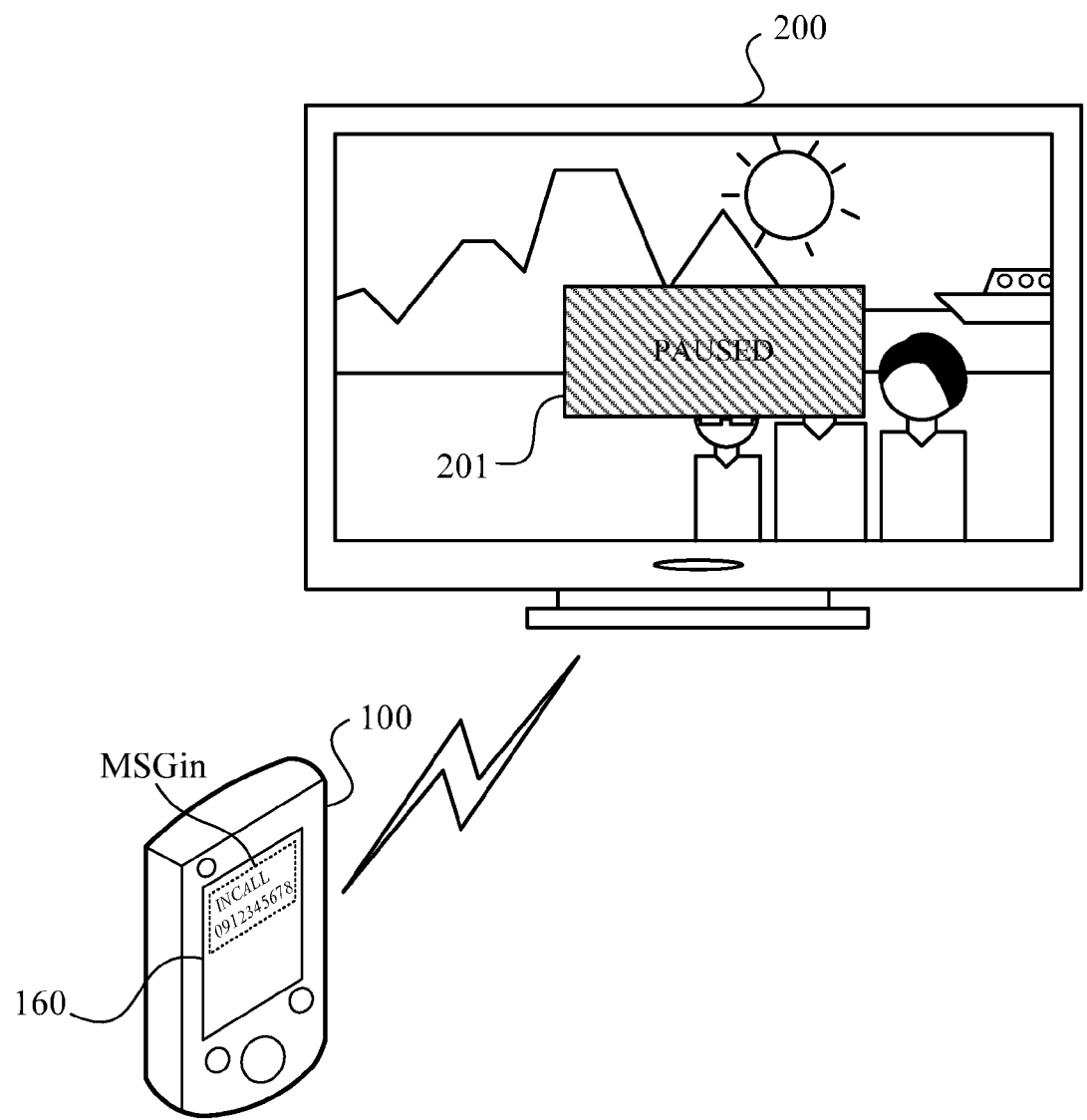
FIG. 3 is a schematic diagram illustrating an example of the wireless projection of the handheld communication device being interrupted by a notification event.

Reference is also made to FIG. 3, which is a schematic diagram illustrating an example of the wireless projection of the handheld communication device 100 being interrupted by a notification event. As shown in FIG. 3, if the incoming notification event is listed in the high-priority list, the wireless projection module 120 suspends a screen of the wireless projection, and a suspended prompt box 201 can be displayed on the external displayer 200. As shown in FIG. 3, the handheld communication device 100 is casting a video on the external displayer 200 through the wireless projection module 120 before the incoming notification event. When the incoming notification event is received, the casting of the video is suspended and the suspended prompt box 201 pops out. In the embodiment, the handheld communication device 100 displays the contents MSGin of the incoming notification event onto the displaying module 160 of the handheld communication device 100, so as to avoid projecting the information about personal privacy onto the external displayer 200 by mistakes.

In another embodiment, the contents of the incoming notification event can also be projected (not shown in figures) onto the external displayer 200 (e.g., replacing the original contents in the previous projection) according to a user instruction.

On the other hand, the notification filtering unit 144 estimates/determines that the incoming notification event is not listed in the high-priority list, the handheld communication device 100 keeps on performing the wireless projection, such that the currently casting image contents remain to be played, and the incoming notification event is set to be pending. When the user completes the wireless projection, the user can go back to the pending notification event during the period of the wireless projection.

It is noticed that, before the high-priority list is automatically established by the notification filtering unit 144, the notification filtering unit 144 in an embodiment is configured to collect critical information (or key information) of the handheld communication device by a background process. The high-priority list is automatically established according to the critical information.

In an embodiment, the critical information is selected from a contact list of the handheld communication device 100, a group classification (boss, families, children, emergency contacts, important clients, colleagues, classmates, friends, etc) of the contact list, notification event type(s) (e.g., at least one of a in-call notification, an instant message notification, an emergency message notification, an email notification, a system update notification, an application program notification, a calendar notification, a power alert notification and an alarm clock notification) and an image content (e.g., business briefing, family photos, entertainment movies, gaming screens) of the wireless projection.

The notification filtering unit 144 establishes the high-priority list according to aforesaid critical information. For example, the high-priority list include the in-call notification, the instant message notification and the emergency message notification from an important person (e.g., from the boss, one of the emergency contacts or one of the important clients).

Therefore, the high-priority list excludes some minor notification contents, such as a social media post from a friend, a notification from a game application program, a notification of a mobile advertisement, a minor system updating information, etc.

In addition, when the notification filtering unit 144 establishes the high-priority list, the notification filtering unit 144 further adjusts the high-priority list dynamically according to a system clock. For example, during working hours on a weekday, the notification filtering unit 144 preferentially arranges the notification events (the in-call notification, the email notification, the calendar notification, etc) related to the boss, the important clients, the general clients and the colleagues into the high-priority list.

On the other hand, during the night time on a weekday or anytime on the weekends, the notification filtering unit 144 the notification events related to the boss, the important clients, the general clients and the colleagues are excluded from the high-priority list, and instead the notification events (the in-call notification, the email notification, the calendar notification, etc) related to the families, the children, the classmates and the friends are preferentially arranged into the high-priority list. Therefore, the notification filtering unit 144 is able to adjust the high-priority list dynamically according to the current system clock.

Figure 4:
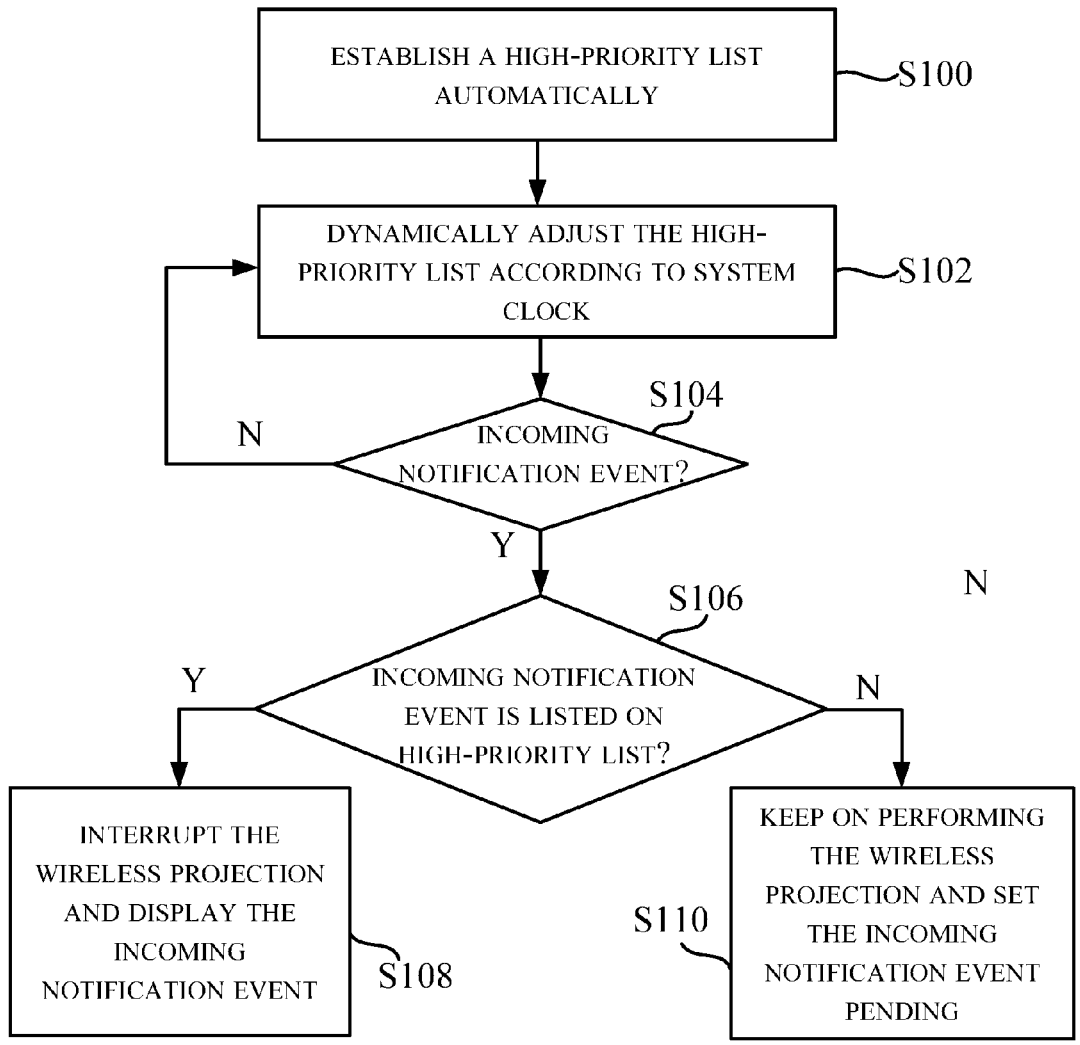
FIG. 4 is a flow chart diagram illustrating an intelligent notification filtering method according to an embodiment of the disclosure.

Reference is made to FIG. 4, which is a flow chart diagram illustrating an intelligent notification filtering method according to an embodiment of the disclosure. The intelligent notification filtering method is suitable to be utilized on a handheld communication device (referring to the handheld communication device as the embodiment shown in FIG. 1 to FIG. 3, but the disclosure is not limited thereto) currently performing a wireless projection.

The intelligent notification filtering method executes step S100 for establishing a high-priority list automatically. In some embodiment, before the high-priority list is automatically established, the intelligent notification filtering method further collects critical information of the handheld communication device by a background process, and establishes the high-priority list according to the critical information.

Aforesaid critical information includes at least one selected from a contact list of the handheld communication device, a group classification of the contact list, a plurality of notification event types (e.g., an in-call notification, an text message notification, an instant message notification, an emergency message notification, an email notification, a system update notification, a notification from an network server terminal of an application program, etc) and an image content of the wireless projection.

In addition, after the high-priority list is established in step S100, the intelligent notification filtering method further executes step S102 for dynamically adjusting the high-priority list according to a system clock. Aforesaid contents of the critical information and the dynamic adjustment can be referred to detail explanations of the notification filtering unit 144 in previous embodiments, and not repeated here.

In the embodiment, step S104 is executed for determining whether the handheld communication device receives an incoming notification event. If there is not incoming notification event, it returns to step S102.

If there is an incoming notification event received by the handheld communication device, step S106 is executed for determining whether the incoming notification event is listed on the high-priority list or not.

If step S106 determines that the incoming notification event is listed on the high-priority list, step S108 is executed for interrupting the wireless projection on the handheld communication device and displaying contents of the incoming notification event (referring to FIG. 3 and related explanations). On the other hand, if step S106 determines that the incoming notification event is not listed on the high-priority list, step S110 is executed for keeping on performing the wireless projection by the handheld communication device and setting the incoming notification event pending.

Based on aforesaid embodiment, this disclosure provides an intelligent notification filtering method and a handheld communication device, which are capable of establishing a high-priority list automatically, filtering an incoming notification event according to the high-priority list, and selectively interrupting a wireless projection or setting the incoming notification event pending. Therefore, the user will not be interrupted by a minor notification when the wireless projection is performing on the handheld communication device, and the user will not miss an important notification message as well.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. An intelligent notification filtering method, suitable for a handheld communication device performing a wireless projection, the intelligent notification filtering method comprising:
   establishing a high-priority list automatically;
   in response to the handheld communication device receiving an incoming notification event, determining whether the incoming notification event is listed in the high-priority list or not;
   interrupting the wireless projection on the handheld communication device and displaying contents of the incoming notification event, if the incoming notification event is listed in the high-priority list; and keeping on performing the wireless projection by the handheld communication device and setting the incoming notification event pending, if the incoming notification event is not listed in the high-priority list.

2. The intelligent notification filtering method of claim 1, wherein, before the high-priority list is automatically established, the intelligent notification filtering method further comprises:

collecting critical information of the handheld communication device by a background process, wherein the critical information is utilized to establish the high-priority list automatically.

3. The intelligent notification filtering method of claim 2, wherein the critical information comprises at least one of the following: a contact list of the handheld communication device, a group classification of the contact list, a plurality of notification event types and an image content of the wireless projection.

4. The intelligent notification filtering method of claim 3, wherein the notification event types comprises at least one of the following: a in-call notification, an instant message notification, an emergency message notification, an email notification, a system update notification, an application program notification, a calendar notification, a power alert notification and an alarm clock notification.

5. The intelligent notification filtering method of claim 2, wherein, in step of establishing the high-priority list automatically, the intelligent notification filtering method further comprises:

dynamically adjusting the high-priority list according to a system clock.

6. A handheld communication device, comprising:

a wireless projection module, configured to wirelessly transmit an image content to an external displayer for projecting the image content onto the external displayer; and a processing module, comprising:

a notification receiving unit configured to receive an incoming notification event; and a notification filtering unit configured to establish a high-priority list automatically, in response to the handheld communication device receiving an incoming notification event, the notification filtering unit determining whether the incoming notification event is listed in the high-priority list or not, wherein, if the incoming notification event is listed in the high-priority list, the wireless projection module interrupts the wireless projection on the handheld communication device and displays contents of the incoming notification event, if the incoming notification event is not listed in the high-priority list, the wireless projection module keeps on performing the wireless projection and sets the incoming notification event pending.

7. The handheld communication device of claim 6, wherein the notification filtering unit collects critical information by a background process and automatically establishes the high-priority list according to the critical information.

8. The handheld communication device of claim 7, wherein the critical information comprises at least one of the following: a contact list of the handheld communication device, a group classification of the contact list, a plurality of notification event types and an image content of the wireless projection.

9. The handheld communication device of claim 8, wherein the notification event types comprises at least one of the following: a in-call notification, an instant message notification, an emergency message notification, an email notification, a system update notification, an application program notification, a calendar notification, a power alert notification and an alarm clock notification.

10. The handheld communication device of claim 7, wherein the notification filtering unit further adjusts the high-priority list dynamically according to a system clock.

* * * * *